United States Patent [19]

Columbus

[11] 4,437,586

[45] Mar. 20, 1984

[54] MECHANICALLY ACTUATED PIPETTE DISPENSER

[75] Inventor: Richard L. Columbus, Rochester, N.Y.

[73] Assignee: Eastman Kodak Company, Rochester, N.Y.

[21] Appl. No.: 362,931

[22] Filed: Mar. 29, 1982

[51] Int. Cl.³ .......................... B67D 5/06; G01F 11/06

[52] U.S. Cl. .................................... 222/181; 222/309; 73/864.23

[58] Field of Search ........... 73/864.15, 864.16, 864.23; 604/124, 125, 207, 208, 209, 210, 184, 224, 231; 222/43, 185, 309, 333, 386, 391, 180, 181

[56] References Cited

U.S. PATENT DOCUMENTS 3,161,323 12/1964 Bent .................................... 222/41
3,166,938 1/1965 Weyrauch et al. ................ 73/421.5
3,248,950 5/1966 Pursell et al. ........................ 73/425.6
3,290,946 12/1966 Pursell .............................. 73/864.15
4,099,548 7/1978 Sturm et al. ........................... 141/27
4,316,558 2/1982 Kubiak ................................ 222/181
4,335,621 6/1982 Tervamaki et al. .............. 73/863.32

FOREIGN PATENT DOCUMENTS 884118 7/1980 Belgium .

*Primary Examiner*—Joseph J. Rolla
*Assistant Examiner*—Michael S. Huppert
*Attorney, Agent, or Firm*—Dana M. Schmidt

[57] ABSTRACT

A liquid dispenser is disclosed, comprising a vented pipette and an actuator for the pipette. The actuator includes apparatus for mounting the pipette and a mechanism for automatically lowering a piston into the pipette to a predetermined starting level before the pipette vent is sealed, to insure that a predictable quantity of liquid is dispensed once the vent is sealed.

8 Claims, 10 Drawing Figures

MECHANICALLY ACTUATED PIPETTE DISPENSER

FIELD OF THE INVENTION

This invention relates to apparatus and a process for dispensing liquids, such as biological liquids, for chemical analysis.

BACKGROUND OF THE INVENTION

Mechanical actuating means, hereinafter "actuators", have been used prior to this invention to removably mount and to actuate vented pipettes so that the contents are dispensed. By the push of a lever or a button, a ratchet is advanced in steps to cause a piston or plunger of the pipette to repeatedly dispense a predetermined, fixed amount of liquid. The advantage of such a mechanism is that it reduces the opportunity for the errors that often occur when pipettes are operated manually. When a new pipette is filled for dispensing, the previously emptied pipette is removed and the new one mounted in the actuator. Examples of such devices are described in U.S. Patent No. 3,161,323.

One difficulty with such mechanical actuators is that, unless prohibitively expensive pipette designs are used, the piston of the pipette is not reliably at a predetermined height as to accurately line up with the driving surface of the actuator. Because of this, either the actuator or the pipette must be adjusted by less than a whole step to bring the actuator's driving surface into contact with the piston of the pipette, a process hereinafter referred to as "initializing." However, initializing by altering the location of the driving surface is generally not desirable. It is particularly unsatisfactory when the actuator is programmed to operate in fixed steps only, as noted. If the pipette piston's initial location should be between one of the fixed levels defining the steps, the driving surface would have to be moved downward or upward during initializing by less than a whole step. Such movement would alter the volume of the first quantity to be dispensed.

On the other hand, initializing by adjusting the pipette and particularly the piston of the pipette has not been desirable prior to this invention. At best, manually readjusting the pipette to obtain contact with the driving surface is time consuming. At worst, such adjustment might require that the piston be lowered to the level of the driving surface. If the vent of the pipette accidentally becomes closed while the piston is being so lowered, undesired liquid dispensing occurs. Since the pipette vent is conveniently an aperture through the top of the piston at the very place force is normally applied to depress the piston, it has been difficult to downwardly adjust the piston without closing the vent.

Because of the above problems, use of mechanical actuators of pipettes has been less than satisfactory. Particularly the initializing problem has been acute when many individual pipettes are to be sequentially inserted into the actuator, each with a potentially different initial piston location.

Therefore, what has been needed is a mechanical actuator for a pipette and particularly a vented pipette, which automatically orients the piston and actuator driving surface without any loss of the liquid contained in the pipette.

SUMMARY OF THE INVENTION

The invention is directed to apparatus and a process for dispensing a fixed quantity of liquid from a vented pipette which automatically initializes without accidental dispensing.

More specifically, in accord with one aspect of the invention, there is provided actuating means for dispensing a fixed amount of liquid from a pipette. The pipette for use therewith includes means at a first end for containing the dispensable liquid, a compression chamber in fluid communication with the containing means, compressing means, including a piston, movably mounted within the chamber, and means for venting the pipette to the atmosphere. The actuating means includes mounting means for removably securing the compression chamber, and moving and sealing means for sequentially (1) moving the piston, with the chamber vented, to a predetermined starting position relative to the mounting means, and (2) thereafter sealing the venting means.

In accord with a second aspect of the invention, the actuator noted above provides, in combination with a vented pipette, a highly useful dispenser.

Thus, it is an advantage of the present invention that an actuator is provided for mechanically dispensing liquid from a pipette, that avoids both (a) accidental dispensing of the liquid during the initializing step, and (b) undesired altering of the first dispensed quantity.

It is a related advantage of the invention that pipettes can be used for dispensing without requiring expensive constructions.

Other advantages and features will become apparent upon reference to the following Description of the Preferred Embodiments when read in light of the attached drawings.

DESCRIPTION OF THE PREFERRED EMBODIMENTS

The initializing problems noted above in prior actuators have been solved by this invention, in part by arranging the actuator so that the uppermost surface of the piston is always above the driving surface of the actuator during the first stage of mounting the pipette. Initializing occurs using means that automatically depress the piston until it is lowered to the height of the driving surface. Because the actuator is constructed so that the piston vent is not closed until after the initializing is completed, no accidental dispensing pressure is generated.

Locations such as "above", "below", and the like, and adjectives such as "uppermost", refer to the noted locations and features during the intended use of the dispenser of this invention.

Figure 1:
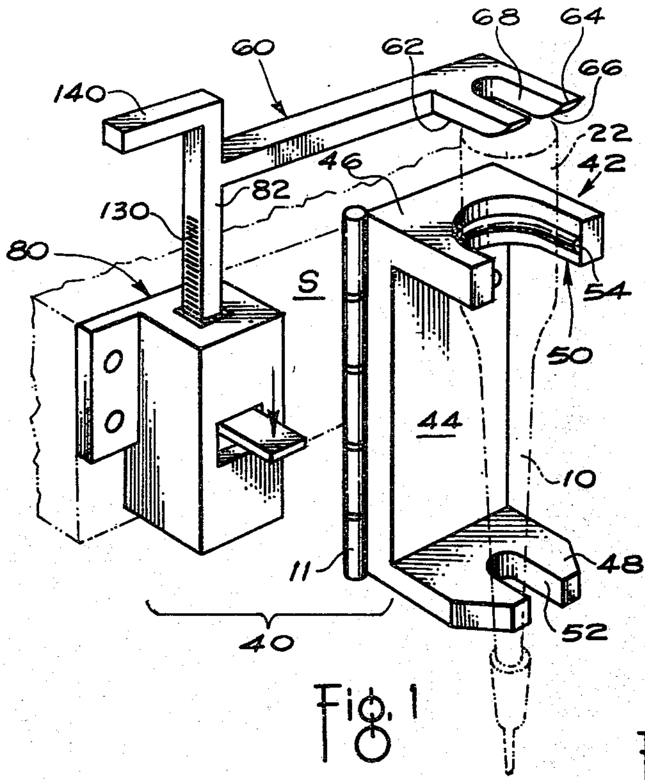
FIG. 1 is a perspective view of a dispenser constructed in accordance with the invention, the pipette portion being shown in phantom.

An actuator 40 as shown in FIG. 1 comprises a mounting bracket 42, a piston actuation arm 60, and means 80 for moving both said arm and a contacted pipette piston. Conveniently, both bracket 42 and means 80 are mounted on a supporting surface S, shown in dashed outline. Means 80 are preferably fixedly mounted on surface S, whereas bracket 42 is either fixedly mounted as shown, or pivotally mounted for rotation about a vertical axis 11.

Figure 2:
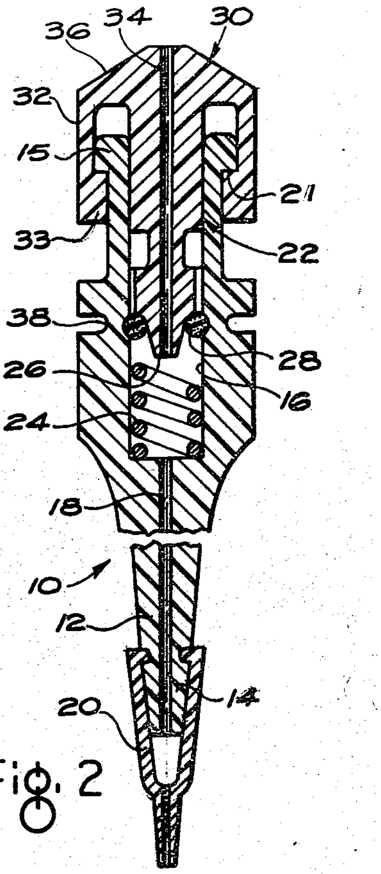
FIG. 2 is a fragmentary vertical section view of the pipette portion of the invention.
Figure 3A:
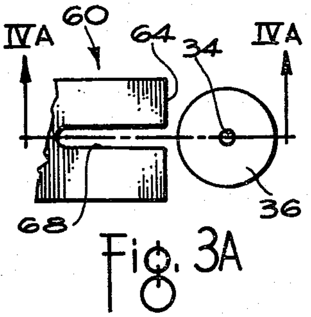
FIGS. 3A–3C are fragmentary plan views of the actuation arm and of the piston of the pipette as the latter is moved into its mounted position in the former.
Figure 3B:
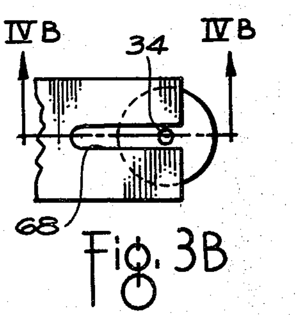
Figure 3C:
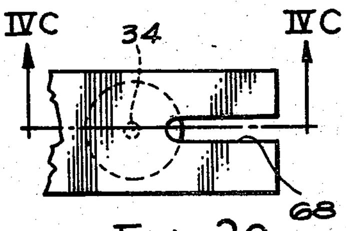

Various vented pipettes are useful with this actuator. Preferably, FIG. 2, such a pipette 10 comprises an elongated body 12 having at one end 14 means 20 for containing liquid, and at the end 15 opposite to end 14, a compression chamber 16 in liquid communication with end 14 via a bore or passageway 18. Containing means 20 preferably is a disposable container as shown, that snaps onto end 14. Alternatively, a container that is integral with the rest of the pipette is also useful. Disposable containers are advantageous in that only this portion of the pipette, rather than the entire pipette, need be thrown away after a given sample is dispensed, to avoid contamination. Such disposable containers have a variety of useful shapes, which are not critical to this invention.

Body end 15 terminates in an annular lip 21. A piston 22 is mounted for reciprocation within chamber 16, and is biased upwardly along the axis of bore 18 by means such as a compression spring 24. End 26 of the piston proximal to bore 18 is provided with an 0-ring seal 28, as is conventional. The distal end 30 has an integral sleeve portion 32 that telescopes around end 15 of the pipette. Sleeve portion 32 has an inwardly projecting rib 33 that locks against lip 21 to prevent the piston from ejecting from chamber 16. A vent aperture 34 extends down the middle of the piston, preferably aligned with bore 18, from piston end 26 to piston end 30. Piston end 30 at the aperture 34 provides the uppermost surface of the pipette and the piston, for cooperation with the actuator as hereinafter described. End 30 has a beveled surface 36 extending from aperture 34 to sleeve portion 32 at an angle adapted to cam the piston, as is also hereinafter described.

Intermediate the ends 14 and 15, body 12 of the pipette is notched at 38 around its circumference, to accurately locate the pipette within the actuator.

Mounting bracket 42, FIG. 1, has a central portion 44 and two end flanges 46 and 48, each notched at 50 and 52, respectively. The notches are sized to receive the pipette. Notch 50, in turn, has a raised lip or ridge 54 adapted to fit within notch 38 of the pipette body 12.

Piston actuation arm 60 comprises piston driving surface 62, FIGS. 1, 4A-4C and 5, provided adjacent the extreme end 64 of the arm. Preferably surface 62 comprises resilient means for sealing vent aperture 34 of the pipette when surface 62 contacts the latter. Conventional materials such as silicone rubber styrenebutadiene, isoprene, nitrile rubber and fluorocarbon rubber are highly useful resilient materials for this purpose. Driving surface 62 is positioned above flange 46 by the cantilevered attachment of arm 60 to member 82 of moving means 80, discussed hereinafter.

In accordance with one aspect of the invention, to automatically lower the piston to a predetermined starting level, actuation arm 60 further includes, FIGS. 1, 3A-3C, and 4A-4C, a camming surface 66 on the underside of arm 60. Camming surface 66 extends from end 64 to the driving and sealing surface 62 and forms an angle alpha with respect to sealing surface 62, FIG. 4C. Preferably, angle $\alpha$ is at first large, commencing at end 64, and is gradually reduced to provide a convex shape to camming surface 66. Alternatively, a fixed angle adapted to the angle of beveled surface 36 is also useful.

Figure 4A:
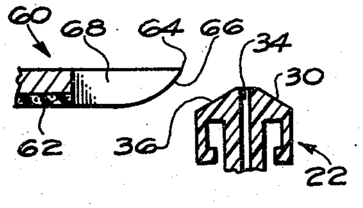
FIGS. 4A–4C are fragmentary vertical section views taken along the lines IVA—IVA, IVB—IVB, and IVC—IVC, respectively of FIGS. 3A–3C.
Figure 4B:
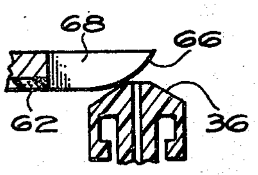
Figure 4C:
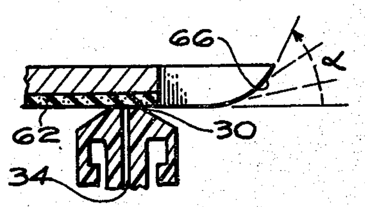

Additionally, arm 60 includes a groove 68 extending through camming surface 66, from end 64 to a location adjacent to driving and sealing surface 62, FIGS. 4A-4C. Groove 68 is centered within camming surface 66 so as to be aligned with vent aperture 34 as the pipette piston is pushed into place, FIGS. 3A-3C.

The cooperation of camming surface 66 and beveled surface 36 of the pipette piston will be readily apparent. As pipette 10 is moved into bracket 42, piston 22 preferably is arranged to be disposed so that end 30 projects above the plane of driving and sealing surface 62, FIG. 4A. However, as the two portions of the combination converge, camming surface 66 cams against beveled surface 36 to lower the piston into its compression chamber 16 and to level the piston at the height of surface 62, FIGS. 3B and 4B. This occurs automatically without any movement of arm 60 relative to chamber 16. While this occurs, chamber 16 and vent aperture 34 are still vented to the atmosphere through groove 68, so that no accidental dispensing of liquid occurs. It is not until end 30 of the piston is aligned and in contact with the driving and sealing surface 62 that vent aperture 34 becomes closed, FIGS. 3C and 4C.

In this fashion, piston 22 is forced to start compression within chamber 16 always from the same starting level. As a result, the first volume dispensed each time a pipette is mounted in actuator 40, is predictably the same predetermined fixed volume. Thereafter, any further lowering of the piston in response to the lowering of arm 60 causes another compression buildup within chamber 16 until another predetermined amount of liquid is accurately dispensed from containing means 20. The stepped sequence repeats with additional downward movement of arm 60: pressure builds up, and a quantity of liquid is dispensed, releasing the pressure. It will be appreciated that compression chamber 16 is vented to the atmosphere only during the initializing that occurs as depicted in FIGS. 3A-3C and 4A-4C. Thereafter, it remains sealed during the subsequent dispensing.

Arm 60 has a sufficient thickness to accommodate the expected variations occurring in the location of end surface 30 as individual pipettes are mounted in bracket 42. Such variations are generally less than 0.4 cm for the type of pipette described above.

To accomplish the incremental movement of sealing surface 62 that lowers pipette piston 22 into chamber 16, member 82 to which actuation arm 60 is attached is lowered a fixed amount by moving means 80. More specifically, moving means 80 preferably comprises a ratchet 84 formed on an integral surface of member 82, FIGS. 5 and 6, a box mount 86 for member 82, and a pawl 120 levered within box mount 86 to engage ratchet 84. Dimensions of these items have been enlarged for clarity. Ratchet 84 comprises a plurality of teeth 85 each of which has a bottom groove 87 and an outer edge 89 projecting out of the groove, FIG. 5. Box mount 86 is provided with a top plate 90 having a rectangular opening and bushings 92 and 93 sized to slidably accommodate member 82. The fit between the bushing and member 82 is a friction fit adapted to hold member 82 in place except when it is lowered by the pawl. A back plate 94 of box mount 86 has a shoulder or stud 96 the internal end of which has a bushing 98 against which member 82 slides. Front plate 100 of box mount 26 is apertured at 102 to receive a pawl lever 122. Aperture 102 comprises a top surface 104 that forms a starting locus for the travel of the pawl, and therefore the ratchet, and a bottoming surface 106 for the pawl lever. Surface 106 is apertured to anchor one end of a biasing compression spring 108, the other end of which is secured to a stud 112 on the pawl lever.

Figure 6:
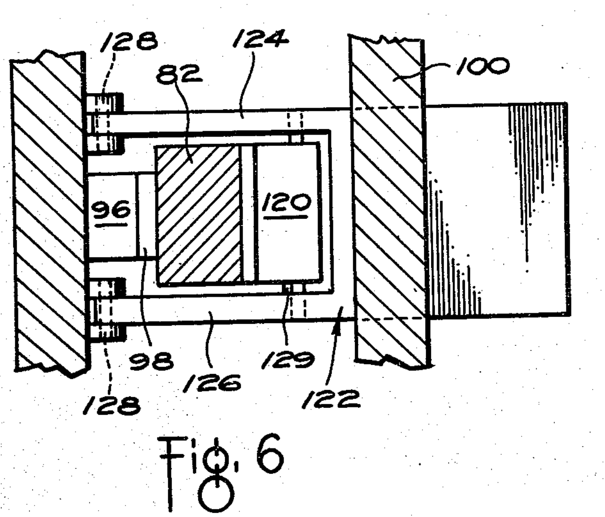
FIG. 6 is a fragmentary section view taken generally along the line VI—VI of FIG. 5.

Pawl 120 is journalled at pin 121 to lever 122 which comprises a bifurcated element having two arms 124 and 126, FIG. 6, that straddle member 82. Arms 124 and 126 are pivotally mounted on back plate 94 at 128. A torsion spring 129 biases pawl 120 against member 82.

Figure 5:
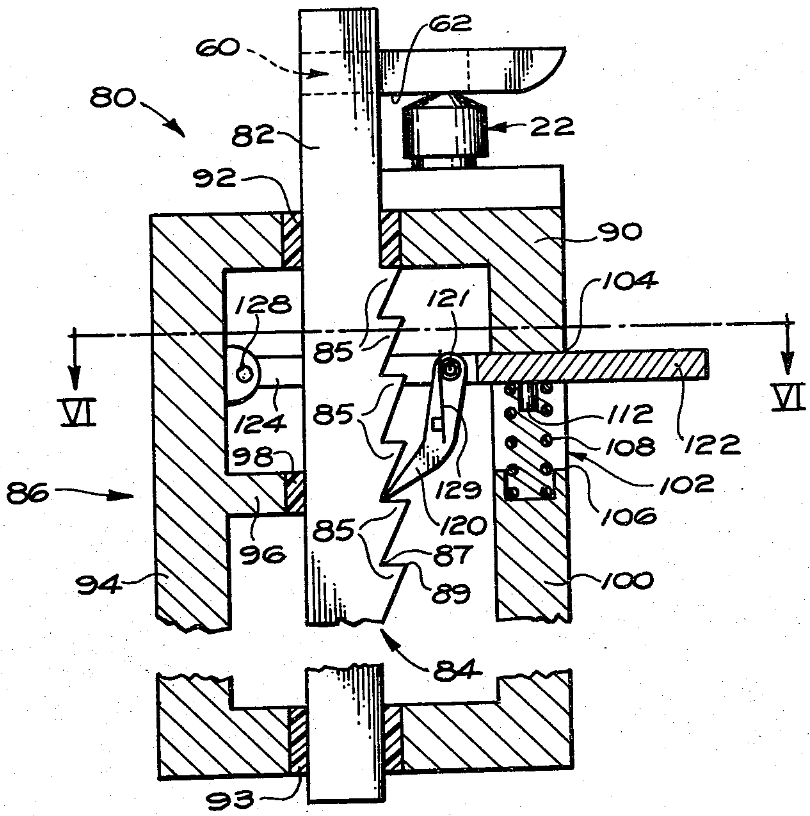
FIG. 5 is a fragmentary vertical section view taken through member 82 of the moving means 80 shown in FIG. 1.

By this construction, when lever 122 is lowered against spring 108, FIG. 5, pawl 120 forces member 82 down a fixed distance until lever 122 bottoms against surface 106 of the aperture. For a dispensed quantity of about 10 $\mu$l, lever 122 rotates about 30° and piston 22 travels about 0.127 cm. As lever 122 is returned to stop against top surface 104, pawl 120 rotates counterclockwise so as to clear the ratchet tooth 85 next above it. The distance between bottom groove 87 and outer edge 89 of each ratchet tooth is designed to be the distance the pawl travels as lever 122 is returned to bear against top surface 104.

Indicia 130 are preferably placed on member 82, FIG. 1, representing cumulative totals of the volume displaced by the steps or increments through which member 82, arm 60 and piston 22 are moved. A handle 140 is preferably disposed on member 82 to permit manual return of means 80 to the initial starting position after a pipette has been emptied or is otherwise no longer needed. Pawl 120 is rotated against spring 129, out of the way of teeth 85, by rotating a knob, not shown, secured to the end of pin 121. The spacing of the teeth 85 is designed so that, when member 82 is pulled up to the starting position shown in FIG. 5, pawl 120 is bottomed in one of the grooves 87.

The materials for the actuator are not critical, and can be selected from conventional materials such as metal or plastic.

The invention has been described in detail with particular reference to preferred embodiments thereof, but it will be understood that variations and modifications can be effected within the spirit and scope of the invention.

What is claimed is:

1. In a dispenser including a pipette comprising means at a first end for containing liquid for dispensing, a compression chamber in fluid communication with said first end, compressing means, including a piston, for providing fluid compression within said chamber, and means for venting said chamber to the atmosphere, and actuating means including mounting means for receiving said pipette and for removably securing the compression chamber of said pipette in a fixed position and means for engaging and moving said compressing means by a predetermined distance to dispense a fixed amount of liquid;

the improvement wherein said actuating means includes moving and sealing means, operable during receipt of said pipette, for sequentially: (1) moving said piston with said chamber in a vented condition, to a predetermined starting position relative to said mounting means while said actuating means is stationary with respect to said compression chamber, and (2) thereafter sealing said venting means, whereby said piston is automatically initialized without dispensing any of the liquid contained by said pipette.

2. A dispenser as defined in claim 1, wherein said venting means comprises a vent aperture extending through said piston to an end of said pipette that is opposite said first end, and wherein said actuating means comprises a cantilevered piston-actuation arm having a camming surface and a sealing surface adapted to seal against said vent aperture when said pipette is fully mounted in said actuating means, said camming surface extending from the cantilevered end of said actuation arm to said sealing surface, said camming surface having a groove extending from said cantilevered end to a location adjacent said sealing surface, said groove being positioned to expose to the atmosphere said vent aperture as said pipette is being mounted in said actuating means and lowered to said starting position by said camming surface.

3. A dispenser as defined in claim 2, and further including incrementing means for moving in increments said actuation arm and said piston to provide compression within said chamber, each increment corresponding to a desired volume of dispensed liquid.

4. A dispenser as defined in claim 3, wherein said incrementing means comprises a pawl and ratchet, said actuation arm being operatively connected to a member having said ratchet as a portion thereof.

5. Actuating means for dispensing a fixed amount of liquid from a pipette having means at one end for containing the dispensable liquid, a compression chamber in fluid communication with said containing means, compressing means, including a piston movably mounted within said chamber, for providing compression within said chamber, and means for venting the pipette to the atmosphere;

the actuating means comprising means for receiving said pipette and for removably mounting said compression chamber in a fixed position, means for engaging and moving said piston a predetermined distance to dispense a fixed amount of liquid, and means, operable during receipt of said pipette, for sequentially: (1) moving said piston with said chamber in a vented condition, to a predetermined starting position relative to said mounting means while said actuating means is stationary with respect to said compression chamber, and (2) thereafter sealing said venting means, whereby said piston is automatically initialized without dispensing any of the liquid contained by said pipette.

6. Actuating means as defined in claim 5, wherein the pipette venting means comprises a vent aperture extending through said piston to an end of said pipette opposite to said one end, and wherein said actuating means comprises a cantilevered piston-actuation arm having a camming surface and a sealing surface adapted to seal against said vent aperture when said pipette is fully mounted in said actuating means, said camming surface extending from the cantilevered end of said actuation arm to said sealing surface, said camming surface having a groove extending from said cantilevered end to a location adjacent said sealing surface, said groove being positioned to expose to the atmosphere said vent aperture as said pipette is being mounted in said actuating means and lowered to said starting position by said camming surface.

7. Actuating means as defined in claim 6, and further including incrementing means for moving in increments said actuation arm and said piston sealed against said sealing surface to compress air within said chamber, each increment corresponding to a desired volume of dispensed liquid.

8. Actuating means as defined in claim 7, wherein said incrementing means comprises a pawl and ratchet, said actuation arm being operatively connected to a member having said ratchet as a portion thereof.

* * * * *